United States Patent Office 3,245,123
Patented Apr. 12, 1966

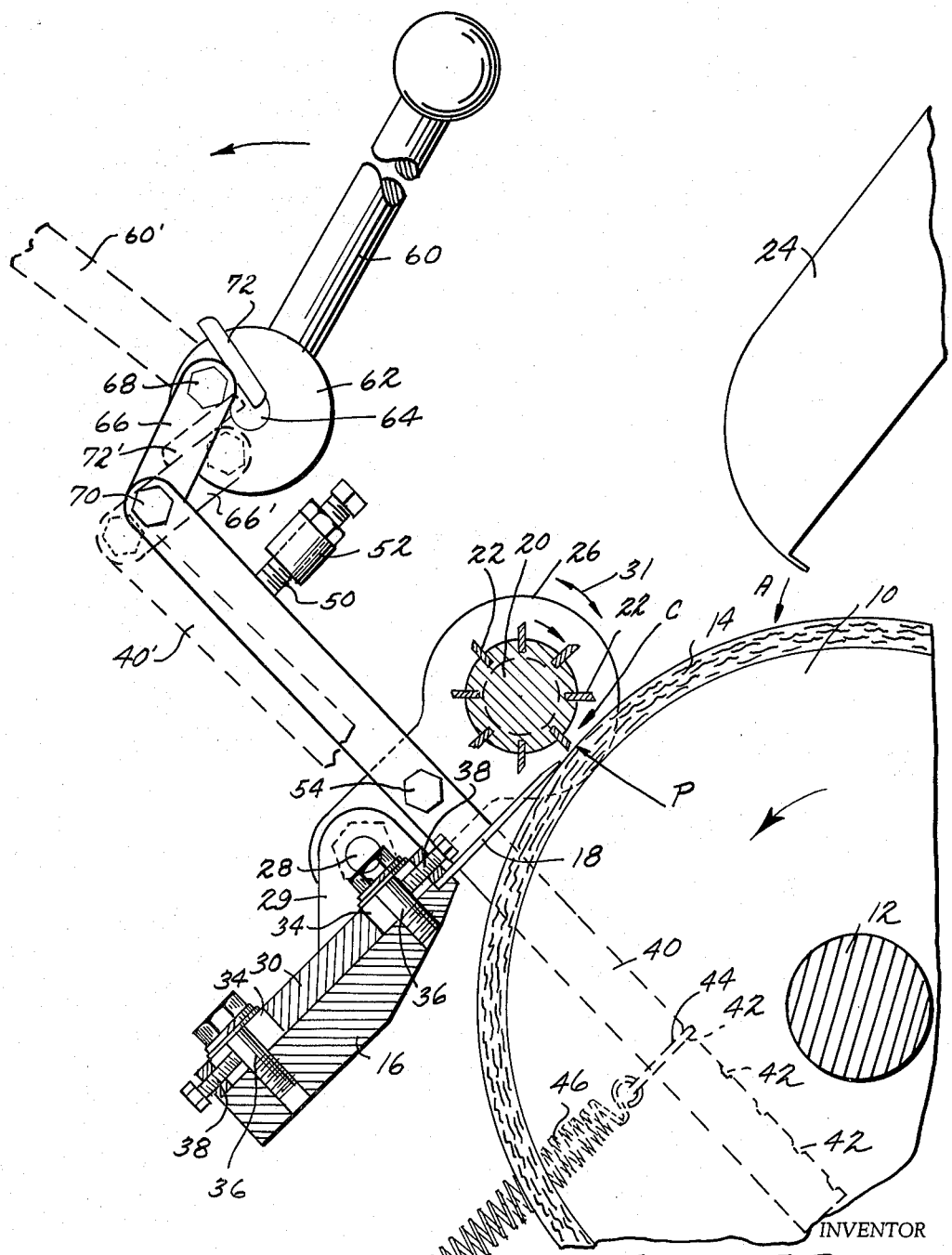

3,245,123
ROLLER COTTON GIN
Eugene H. Brooks, Sherman, Tex., assignor to Hardwicke-Etter Company, Sherman, Tex., a corporation of Texas
Filed May 3, 1963, Ser. No. 277,869
7 Claims. (Cl. 19—53)

The present invention relates to a roller gin construction for stripping lint from the seed of seed cotton by means of a fixed knife having a thin forward beveled edge presented tangentially of a rotary ginning roller.

Roller gins of this type have been known for many years, early designs having employed a ginning roller with a friction surface to which the lint would adhere, a fixed doctor knife which was disposed in tangential contact with the surface of the roll, and a relatively small knocker or stripper roll having radially extending fingers or vanes which cooperated with the surface of the ginning roll and with the fixed doctor knife in the ginning action and in stripping the seed from the lint. Such early roller gins are disclosed in Patent 1,226,317 to Dodd, Patent 1,418,106 to Tischer and Patent 1,490,915 to Cross.

Several years ago interest was renewed in roller gins by the successful operation of a "flight bar" type of roller gin by the U.S. Department of Agriculture. In place of the knocker or stripper roller, this gin uses a series of seed engaging blades or bars which are moved inwardly toward and then outwardly beyond the forward edge of the fixed doctor knife, on an endless chain, the surface of the ginning roller acting to pull lint from the seeds while the latter are restrained by the bars, and the bars thereafter convey the seeds away over the top surface of the fixed knife. This gin is described in Patent 2,929,111 to Williams et al. and in the patentees' article entitled "A New Roller Gin" in "The Cotton Gin and Oil Mill Press" of August 9, 1958.

An important object of the present invention is to provide a roller gin of operation as described above having a mounting assembly for the seed engaging blades which is adjustable to secure the desired ginning and seed removing action and which is also yieldably arranged with respect to the ginning roller and its associated fixed doctor knife, whereby any excess amount of seed cotton which may accumulate between the ginning roller and the seed engaging blades is automatically and continuously relieved and passed beyond and outwardly of the knife, thereby avoiding choking of the gin, or spasmodic operation thereof which would otherwise result from the periodic excess accumulations of wads of seed cotton, as mentioned.

In the drawing:

The single figure of the drawing discloses only that portion of the roller gin necessary to illustrate the arrangement of the fixed lint removing knife and the rotary seed engaging blade assembly, in their relation to the surface of the ginning roller. It will be understood that the parts shown are mounted on a suitable frame, and the moving parts are appropriately driven, all as will be understood by those skilled in the art and with reference to prior patents and known devices, some of which are referred to herein.

Referring to the drawing, a ginning roller 10 of usual construction is mounted for rotation on and with a shaft 12. The shaft is appropriately driven in the direction of the arrow as is understood in the art, from any suitable source of power, and at a speed as selected for best ginning operations. The shaft 12 is mounted in the end walls of the frame of the gin stand, and pulleys, gears or other suitable means are provided on the outer wall of the frame or casing for driving the ginning roller 10, from any source of power such as an electric motor. The ginning roller 10 has a friction surface or cover 14, of suitable thickness, a known material being selected which will cause adherence of the cotton fibers to the surface of the roller.

Also mounted in fixed position on the frame, and between the end walls thereof, is a breast plate 16 which carries the fixed doctor knife 18, the latter having a beveled forward edge which is presented tangentially toward the direction of movement of the surface 14 of the ginning roller 10, and substantially in contact therewith, all as is well understood in the art.

To cooperate with the ginning roller 10 and the fixed knife 18, in removing seed from the seed cotton, a moving blade doffer or seed stripper assembly is provided comprising a drum or shaft 20 carrying a plurality of radial blades 22, with bevelled outer edges as shown. By any suitable means which are known to those skilled in the art (such as pulleys and motor driven belts, not shown) the shaft or drum 20 is driven at an appropriate speed and in a circular direction opposite to that of the ginning roller 10, whereby the ends of the blades 22 are moved inwardly toward the surface of the roller 10 and into closest proximity to the surface 14 at a point P just in advance of the forward end of the fixed knife 18. The speed of the surface 14 at or near the point P will usually be substantially greater than the speed of the blades 22, whereby the surface will perform some ginning by pulling lint from the seeds which are restrained by the trailing sides of the blades 22, in the manner disclosed in the Williams Patent 2,929,111.

Thereafter, further rotation of the shaft or roller 20 causes the blades to move outwardly from the surface of the roller 10, and over the edge of the fixed knife 18, whereby further lint is stripped from the seed by the surface of the ginning roller while the seed is restrained above the edge of the fixed knife 18, and thereafter the seeds are forced outwardly over the top surface of the knife 18 by succeeding blades 22, where they are received in any suitable chute or conveyor mechanism (not shown) and carried thereby to a point of disposal, or the seed may be recirculated through the gin as is known in the art. It will be understood that the seed cotton is delivered to the gin through such as the chute 24 and it is initially received upon the surface of the ginning roller 10 at about the point A.

As previously mentioned, the surface of the ginning roller is such that it frictionally engages the lint, and carries the lint and seed cotton toward the knife 18 and past the blades 22, and various kinds of ginning action may take place between the surface of the roller 10 and the blades 22 and the fixed knife 18, as is known in the art, and as described for instance in some detail in the Williams et al. Patent 2,929,111. Of course, it will be understood that the ginning action may be varied, by adjusting the relative speeds of rotation of the rollers 10 and 20, and in the present invention, the permissible adjustment of the roller 20 with its moving blades 22, as hereinafter described, may also regulate the ginning action. It will be understood that any suitable means known in the art (not shown) may be employed to vary the speeds of the rollers 10 and 20.

The shaft or roller 20 is carried for rotation in a pair of bearing members, disposed at opposite ends of the ginning roller 10. Only one of these bearing members is shown, and it is designated by the numeral 26. These bearing members are mounted for pivotal movement, as at 28, between respective brackets 29 fixed to a mounting pad 30. As hereinafter described, the bearing members 26 are yieldably arranged for pivotal or rocking movement as indicated by the double pointed arrow 31, around the pivot 28.

The mounting pad 30 is adjustably carried on the fixed breast 16, being provided with a pair of elongated slots 34 therein through which pass bolts 36 secured to the fixed breast, as shown. Adjusting screws 38 are threaded through the inner and outer ends of the pad 30, and into the slots 34, and these screws 38 may be adjusted to move the pad 30 and the whole moving blade assembly inwardly and outwardly, and then fixed in the desired adjusted position, in order to secure the desired spacing of the ends of the blades 22 with respect to the surface 14 and the end of the fixed knife 18, as will be understood from the brief description which has been given.

One or both of the bearing arms 26 carry an elongated bar 40 which is provided with a number of spaced notches 42 to receive the hooked end 44 of a spring 46. The opposite end of spring 44 is hooked over a fixed pin 48 carried by the frame of the gin stand. The force of the spring 46 is selected and adjusted in the notches 42, to yieldingly support the rotating blade assembly in selected adjustment with respect to the surface of the ginning roller 10, there being an adjustable stop screw 50 carried on a bracket 52 fixed to the frame, which serves to limit the movement of the assembly and its blades 22 inwardly toward the surface of the ginning roller 10. Bars 40 are fixed to bearings 26 by bolts 54.

With the arrangement as described, the mounting pad 30 may be adjusted in order to secure the desired coaction of the moving blades 22 with the surface of the ginning roller 10 and with the fixed knife 18, and the spring 46 may also be adjusted or regulated, with respect to the adjustment of the stop 50, so that the desired yielding action of the assembly is attained.

In operation, seed cotton is fed through the chute 24 to the surface of the ginning roller, while same is being turned at appropriate speed, along with the turning of the shaft or drum 20, by means well known in the art. The drive is regulated so that the surface of the ginning roller is moving at a considerably greater speed than the ends of the blades 22. Ginning action takes place in the area in advance of the end of the fixed knife 18, and at the forward edge of the fixed knife 18, all as previously described, and as known in the art. It sometimes occurs that the seed cotton enters the critical area C in the form of relatively large wads, and these would tend to either slow down or clog or choke the ginning operation. In the construction of the present invention, however, any such excess accumulation at the critical zone of coaction of the blades, roller and fixed knife, will be automatically relieved by outward pivoting of the bearing 26 around the pivot point 28, and any excess of accumulated material will be continuously passed over the upper edge of the fixed blade 18. This material can be recirculated through the machine, by conveying means well known in the art, to accomplish the desired degree of ginning. When wads of cotton are thus relieved the spring pulls the assembly 20, 22 back to its adjusted position and the normal ginning continues.

In order to remove the blade assembly 20, 22 from the surface of the gin roller 10, a hand crank 60 is provided, same being attached to a cam 62 which turns around a shaft 64 which is fixed to the frame of the gin stand. A link 66 is pivoted to the cam at point 68, and to the end of the bar 40 at 70. When the crank 60 is pulled to the left to its dotted line position 60', the link 66 is moved to its dotted line position 66' and the end of the arm 40 is moved to the dotted line position 40', until a stop 72 on the cam 62 engages the link 66, in its dotted line position as at 72'. This action shifts the link 66 to a point just beyond dead center, and will rock the bearings 26 around the pivot 28, and lock the assembly in position spaced from the drum or ginning roller 10.

It will be understood that lint adhering to the surface of the roller 10 is doffed therefrom by any well known means applied at a point beyond the fixed knife 18. By reason of the yieldable mounting of the blade assembly 20, 22, the operation of the gin is continuous and not spasmodic. The machine will clear itself of accumulated wads by the rocking of the pivoted bearings 26, and when the accumulated material has been passed, said assembly will at once return to its normal position as shown, and normal ginning will continue.

For purposes of simplicity, well known elements of such roller ginning machines as are referred to have been omitted from the drawing. It will be understood that the invention is intended to be used in association with such drive, conveyor and other means as are well known in the art.

I claim:

1. A roller cotton gin comprising a ginning roller having a surface adapted to convey lint fibres and a fixed knife for separating the lint fibres from cotton seed, said knife having a forward edge presented substantially tangentially of the surface of said ginning roller in a direction opposite to that of the rotation of said ginning roller and positioned substantially in contact with said surface, a seed removing assembly comprising a rotary shaft and a plurality of seed engaging blades mounted on said shaft, means for adjusting said assembly whereby the outer edges of said blades are arranged to sweep inwardly toward and in close proximity to said surface and said edge of said knife and then outwardly beyond said forward edge of said knife, means for feeding seed cotton to the surface of said ginning roller in advance of the position of the forward edge of said knife, whereby the surface of said ginning roller strips lint from seeds which are restrained by said blades and the edge of said knife and conveys the lint to a point of removal and said blades lift the seeds over the forward edge of said knife and move them toward a point of disposal, and means for mounting said seed removing assembly for limited yielding movement away from said ginning roller in order to permit passage of excess seed cotton over the forward edge and the outer surface of said knife.

2. A construction in accordance with claim 1 wherein said means for mounting said seed removing assembly provides for its automatic return to its originally adjusted position when the excess seed cotton has been passed.

3. A construction according to claim 1 wherein manually operable means are provided for shifting said mounting means so as to shift said seed removing assembly outwardly from said ginning roller.

4. A construction in accordance with claim 1 wherein said means for adjusting said seed removing assembly provides for shifting same substantially tangentially of said ginning roller.

5. A construction in accordance with claim 1 wherein said means for adjusting said seed removing assembly provides for shifting same longitudinally of said fixed knife.

6. A construction in accordance with claim 1 wherein said mounting means for said seed removing assembly includes a pivoted arm and spring means for urging said assembly toward the ginning roller.

7. A roller cotton gin comprising a ginning roller having a surface adapted to convey lint fibres and a fixed knife for separating the lint fibres from cotton seed, said knife having a forward edge presented substantially tangentially of the surface of said ginning roller in a direction opposite to that of the rotation of said ginning roller and positioned substantially in contact with said surface, a seed removing assembly comprising a rotary shaft and a plurality of seed engaging blades mounted on said shaft, means for adjusting said assembly whereby the outer edges of said blades are arranged to sweep inwardly toward and in close proximity to said surface and said edge of said knife and then outwardly beyond said forward edge of said knife, means for feeding seed cotton to the surface of said ginning roller in advance of the position of the forward edge of said knife, whereby the surface of said ginning roller strips lint from seeds which are restrained by said blades and the edge of said knife and conveys the lint to a point of removal and said blades lift the seeds over the forward edge of said knife and move them toward a point of disposal, means for mounting said seed removing assembly for limited yielding movement away from said ginning roller in order to permit passage of excess seed cotton over the forward edge and the outer surface of said knife, manually operable means for shifting said mounting means so as to shift said seed removing assembly outwardly from said ginning roller and for releasably locking said assembly in its outwardly shifted position.

References Cited by the Examiner

UNITED STATES PATENTS

| | | | |
|---|---|---|---|
| 140,218 | 6/1873 | Rushton et al. | 19—53 |
| 924,793 | 6/1909 | Kent | 19—53 |

FOREIGN PATENTS

| | | |
|---|---|---|
| 1,825 | 1864 | Great Britain. |

DONALD W. PARKER, *Primary Examiner.*

D. NEWTON, *Assistant Examiner.*